(12) United States Patent
Takashima et al.

(10) Patent No.: US 7,466,535 B2
(45) Date of Patent: Dec. 16, 2008

(54) MULTILAYER CAPACITOR

(75) Inventors: Hirokazu Takashima, Nagaokakyo (JP);
Hiroshi Ueoka, Nagaokakyo (JP);
Yoshikazu Takagi, Nagaokakyo (JP)

(73) Assignee: Murata Manufacturing Co., Ltd.,
Kyoto (JP)

( * ) Notice: Subject to any disclaimer, the term of this patent is extended or adjusted under 35 U.S.C. 154(b) by 0 days.

(21) Appl. No.: 12/120,789

(22) Filed: May 15, 2008

(65) Prior Publication Data

US 2008/0204968 A1    Aug. 28, 2008

Related U.S. Application Data

(63) Continuation of application No. PCT/JP2006/321835, filed on Nov. 1, 2006.

(30) Foreign Application Priority Data

Nov. 22, 2005    (JP)    ............... 2005-336537

(51) Int. Cl.
*H01G 4/228*    (2006.01)

(52) U.S. Cl. ............. 361/306.3; 361/306.1; 361/321.1; 361/321.2; 361/308.1; 361/313

(58) Field of Classification Search ............. 361/306.1, 361/306.3, 302–305, 301.1, 301.8, 309, 311, 361/312, 313, 321.1, 321.2

See application file for complete search history.

(56) References Cited

U.S. PATENT DOCUMENTS

| | | | |
|---|---|---|---|
| 6,072,687 A | 6/2000 | Naito et al. | |
| 6,188,565 B1 | 2/2001 | Naito et al. | |
| 6,215,647 B1 | 4/2001 | Naito et al. | |
| 6,226,169 B1 | 5/2001 | Naito et al. | |
| 6,266,228 B1 | 7/2001 | Naito et al. | |
| 6,266,229 B1 | 7/2001 | Naito et al. | |
| 6,292,350 B1 | 9/2001 | Naito et al. | |
| 6,370,010 B1 * | 4/2002 | Kuroda et al. | ............ 361/306.1 |
| 6,407,904 B1 | 6/2002 | Kuroda et al. | |

(Continued)

FOREIGN PATENT DOCUMENTS

JP    05-021429 U    3/1993

(Continued)

OTHER PUBLICATIONS

Official communication issued in International Application No. PCT/JP2006/321835, mailed on Jan. 30, 2007.

(Continued)

*Primary Examiner*—Nguyen T Ha
(74) *Attorney, Agent, or Firm*—Keating & Bennett, LLP

(57) ABSTRACT

In a multilayer capacitor including a capacitor body, first capacitor portions and a second capacitor portion are arranged in the direction of lamination. While a resonant frequency of the first capacitor portions is set to be greater than a resonant frequency of the second capacitor portion so that the first capacitor portions contribute to low impedance, an ESR per layer of the second capacitor portion is set to be greater than an ESR per layer of the first capacitor portions so that the second capacitor portion contributes to high ESR. Further, a combined ESR of the first capacitor portions is set to be substantially equal to a combined ESR of the second capacitor portion.

6 Claims, 8 Drawing Sheets

U.S. PATENT DOCUMENTS

| | | |
|---|---|---|
| 6,430,025 B2 | 8/2002 | Naito et al. |
| 6,441,459 B1 | 8/2002 | Togashi et al. |
| 6,606,237 B1 * | 8/2003 | Naito et al. ............... 361/306.3 |
| 6,657,848 B2 | 12/2003 | Togashi et al. |
| 6,816,356 B2 * | 11/2004 | Devoe et al. ................ 361/309 |
| 7,054,136 B2 * | 5/2006 | Ritter et al. ................. 361/309 |
| 7,310,217 B2 | 12/2007 | Takashima et al. |
| 2006/0203422 A1 | 9/2006 | Togashi |
| 2007/0279836 A1 | 12/2007 | Takashima et al. |

FOREIGN PATENT DOCUMENTS

| | | |
|---|---|---|
| JP | 08-97071 A | 4/1996 |
| JP | 08-162368 A | 6/1996 |
| JP | 2002-164450 A | 6/2000 |
| JP | 2001-185446 A | 7/2001 |
| JP | 2001-185449 A | 7/2001 |
| JP | 2002-100531 A | 4/2002 |

OTHER PUBLICATIONS

Official communication issued in counterpart Japanese Application No. 2007-215720, drafted on Oct. 30, 2007.

Official communication issued in counterpart Japanese Application No. 2005-336537, drafted on Jan. 22, 2007.

Official communication issued in counterpart Japanese Application No. 2005-336537, drafted on Jun. 20, 2007.

Takashima et al.; "Multilayer Capacitor"; U.S. Appl. No. 12/120,870, filed May 15, 2008.

* cited by examiner

<SAMPLE 1>

<SAMPLE 2>

<SAMPLE 3>

<SAMPLE 4>

<SAMPLE 5>

<SAMPLE 6>

<SAMPLE 7>

MULTILAYER CAPACITOR

BACKGROUND OF THE INVENTION

1. Field of the Invention

The present invention relates to multilayer capacitors, and in particular, to a multilayer capacitor which is used in a high-frequency circuit.

2. Description of the Related Art

As a decoupling capacitor that is used in a power supply circuit for an MPU (micro processing unit) in a high-frequency range on the order of several GHz, a known multilayer capacitor is disclosed in Japanese Unexamined Patent Application Publication No. H11-144996. According to this multilayer capacitor, multiple terminals are provided and adjacent terminals have opposite polarities, so that currents from positive terminals to negative terminals are short and currents flow in various paths. Further, currents are caused to flow in opposite directions so that magnetic fluxes are canceled, and thus a reduced ESL (equivalent series inductance) is achieved.

However, according to the multilayer capacitor disclosed in Japanese Unexamined Patent Application Publication No. H11-144996, an ESR (equivalent series resistance) also decreases with decreasing ESL, which results in steep frequency-impedance characteristics.

On the other hand, Japanese Unexamined Patent Application Publication No. 2001-284170 discloses a multilayer capacitor in which for each internal electrode provided in a capacitor body to provide a capacitance, only one lead-out portion extending to the surface of the capacitor body and electrically connected to an external terminal electrode is provided, so that the ESR of the multilayer capacitor is increased.

However, according to the structure described in Japanese Unexamined Patent Application Publication No. 2001-284170, although an ESR can be increased, an ESL increases with increasing ESR. This causes degradation of high-frequency characteristics, as compared with the structure described in Japanese Unexamined Patent Application Publication No. H11-144996.

In addition, according to the multilayer capacitor disclosed in Japanese Unexamined Patent Application Publication No. 2001-284170, in the frequency-impedance characteristics, the resonance point is shifted to the low frequency side. Thus, there is no substantial difference from Japanese Unexamined Patent Application Publication No. H11-144996 in terms of a frequency band in which low impedance can be obtained, and thus it is not possible to increase the width of the frequency band in which low impedance can be obtained.

SUMMARY OF THE INVENTION

To overcome the problems described above, preferred embodiments of the present invention provide a multilayer capacitor which provides a high ESR while providing a low ESL and also increases the width of a frequency band in which low impedance is obtained.

A multilayer capacitor according to a preferred embodiment of the present invention includes a capacitor body having a layered structure composed of a plurality of laminated dielectric layers.

The capacitor body of the multilayer capacitor is composed of first and second capacitor portions.

The first capacitor portion includes at least one pair of first and second internal electrodes opposing each other with a predetermined one of the dielectric layers interposed therebetween to define a capacitance. The second capacitor portion includes at least one pair of third and fourth internal electrodes opposing each other with a predetermined one of the dielectric layers interposed therebetween to define a capacitance.

A resonant frequency of the first capacitor portion is set to be greater than a resonant frequency of the second capacitor portion, and an equivalent series resistance per layer provided by one pair of the third and fourth internal electrodes and an intervening one of the dielectric layers included in the second capacitor portion is set to be greater than an equivalent series resistance per layer provided by one pair of the first and second internal electrodes and an intervening one of the dielectric layers included in the first capacitor portion.

Furthermore, a combined equivalent series resistance provided by all of the first and second internal electrodes and the intervening dielectric layers is substantially equal to a combined equivalent series resistance provided by all of the third and fourth internal electrodes and the intervening dielectric layers.

In the multilayer capacitor according to a preferred embodiment of the present invention, a resonant frequency of the first capacitor portion is set to be greater than a resonant frequency of the second capacitor portion. Thus, a low ESL can be achieved by the first capacitor portion. On the other hand, since an ESR per layer in the second capacitor portion is set to be greater than an ESR per layer in the first capacitor portion, a high ESR can be achieved by the second capacitor portion.

Accordingly, the multilayer capacitor can have characteristics which combine the low ESL characteristics due to the first capacitor portion and the high ESR characteristics due to the second capacitor portion. As a result, a multilayer capacitor satisfying both low ESL and high ESR can be obtained.

In addition, the first capacitor portion and the second capacitor portion have different resonant frequencies and the combined ESR provided by the first capacitor portion is substantially equal to the combined ESR provided by the second capacitor portion. Thus, the entire multilayer capacitor has frequency-impedance characteristics with a wide frequency band in which substantially the same impedance value is continuously obtained from a resonance point of the second capacitor portion in the low frequency side to a resonance point of the first capacitor portion in the high frequency side.

Other features, elements, characteristics and advantages of the present invention will become more apparent from the following detailed description of preferred embodiments of the present invention with reference to the attached drawings.

BRIEF DESCRIPTION OF THE DRAWINGS

FIGS. 3A and 3B show plan views of internal structures of a first capacitor portion 11 shown in FIG. 2, in which FIG. 3A shows a cross-section of a first internal electrode and FIG. 3B shows a cross-section of a second internal electrode.

FIGS. 4A and 4B show plan views of internal structures of a second capacitor portion shown in FIG. 2, in which FIG. 4A shows a cross-section of a third internal electrode and FIG. 4B shows a cross-section of a fourth internal electrode.

DETAILED DESCRIPTION OF PREFERRED EMBODIMENTS

Figure 1:
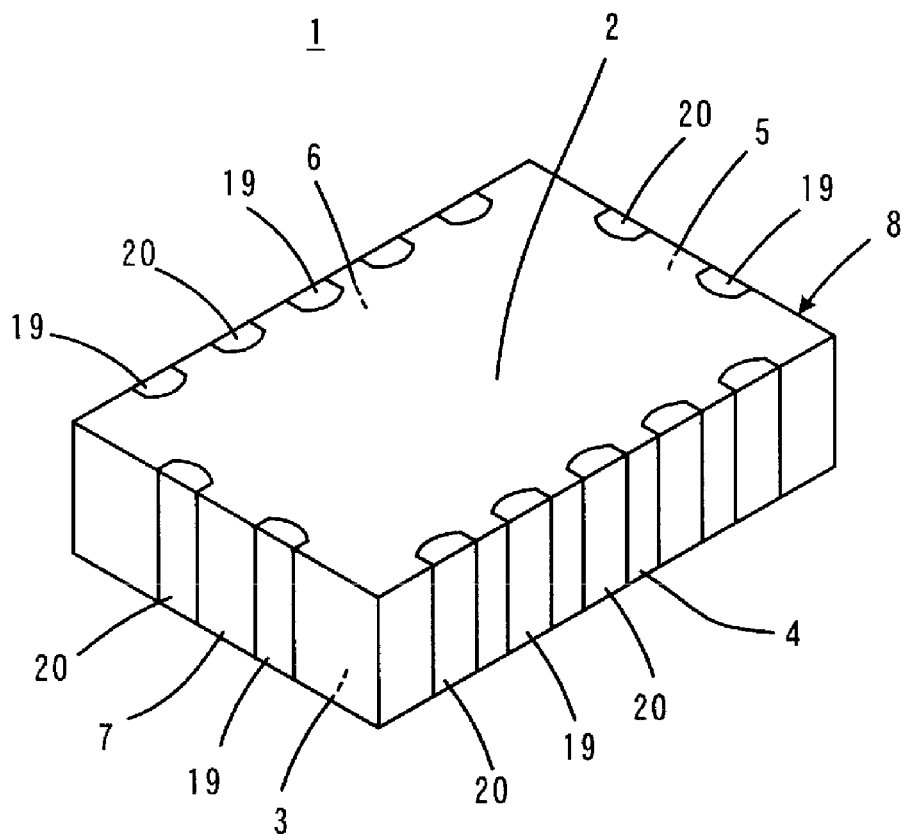
FIG. 1 is a perspective view showing a multilayer capacitor according to a preferred embodiment of the present invention.
Figure 2:
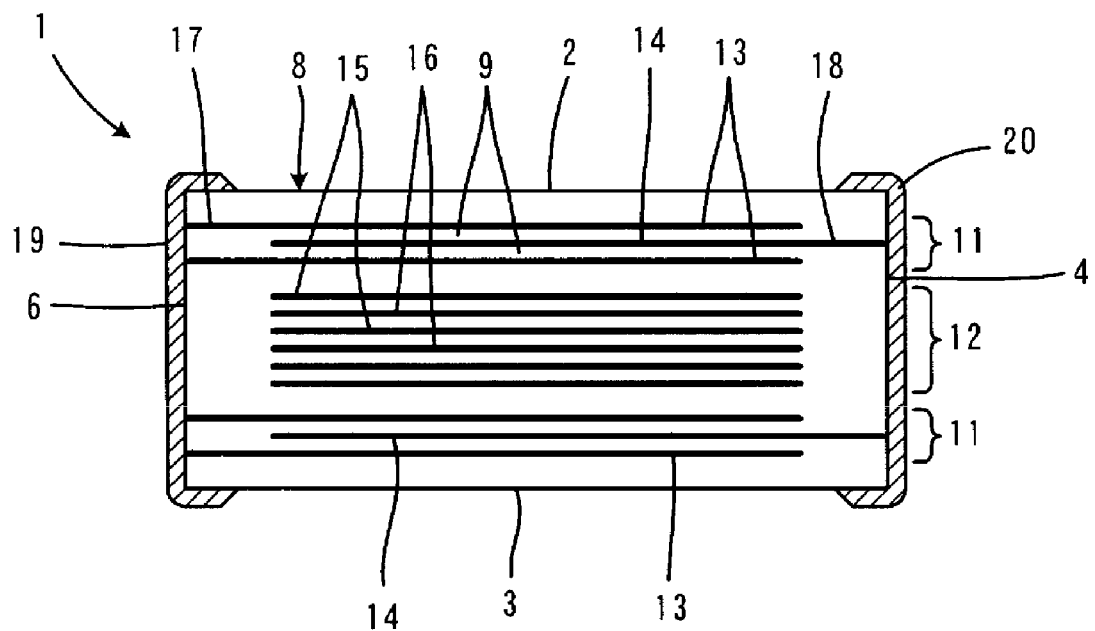
FIG. 2 is an elevational view showing an internal structure of the multilayer capacitor shown in FIG. 1, which is illustrated in cross-section taken along lines II-II in FIG. 3A to FIG. 4B.

FIG. 1 to FIG. 4B show a multilayer capacitor 1 according to a preferred embodiment of the present invention. FIG. 1 is a perspective view showing the multilayer capacitor 1. FIG. 2 is an elevational view showing an internal structure of the multilayer capacitor 1. In FIG. 2, the multilayer capacitor 1 is shown in cross-section taken along lines II-II in FIG. 3A to FIG. 4B.

The multilayer capacitor 1 includes a substantially rectangular parallelepiped shaped capacitor body 8 having two opposing principal surfaces 2 and 3 and four side surfaces 4, 5, 6, and 7 connecting the principal surfaces 2 and 3. The capacitor body 8 has a layered structure composed of a plurality of laminated dielectric layers 9 which extend along the direction of the principal surfaces 2 and 3 and are made of, for example, a dielectric ceramic.

As shown in FIG. 2, the capacitor body 8 includes first and second capacitor portions 11 and 12. In this preferred embodiment, the first capacitor portions 11 and the second capacitor portion 12 are arranged in the direction of lamination, and the second capacitor portion 12 is arranged so as to be sandwiched by the two first capacitor portions 11 in the direction of lamination. As a result, the first capacitor portions 11 are located at opposite ends in the direction of lamination in the capacitor body 8.

The first capacitor portions 11 include at least one pair of first and second internal electrodes 13 and 14 opposing each other with a predetermined one of the dielectric layers 9 interposed therebetween to define a capacitance. The second capacitor portion 12 includes at least one pair of third and fourth internal electrodes 15 and 16 opposing each other with a predetermined one of the dielectric layer 9 interposed therebetween to define a capacitance.

In this preferred embodiment, in order to obtain a larger capacitance, a plurality of pairs of the first and second internal electrodes 13 and 14 and a plurality of pairs of the third and fourth internal electrodes 15 and 16 are provided.

Figure 3A:
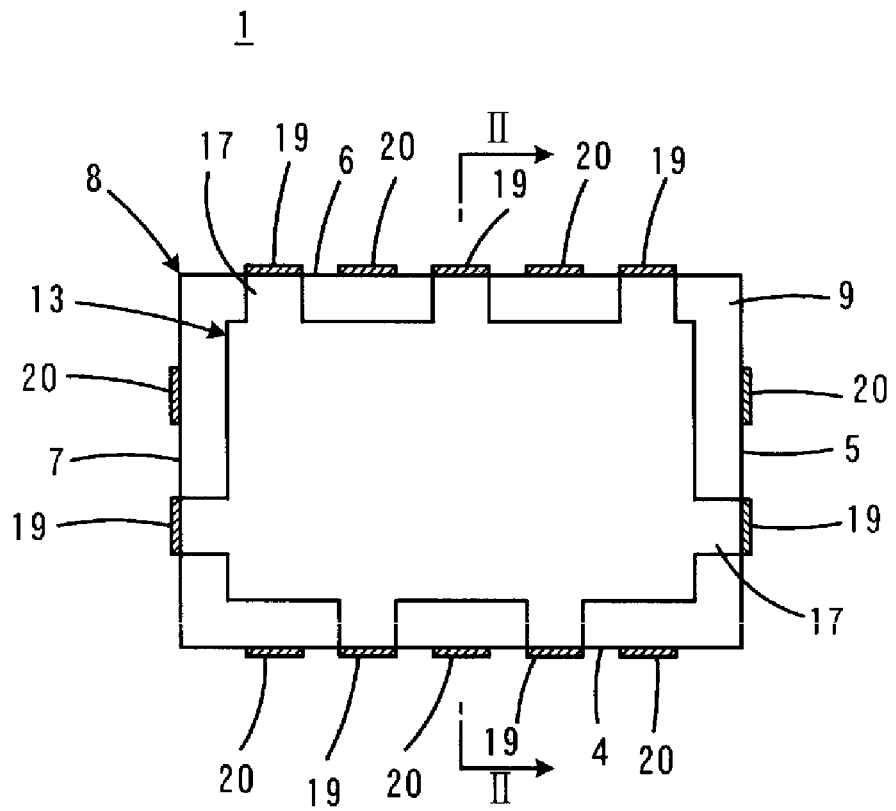
Figure 3B:
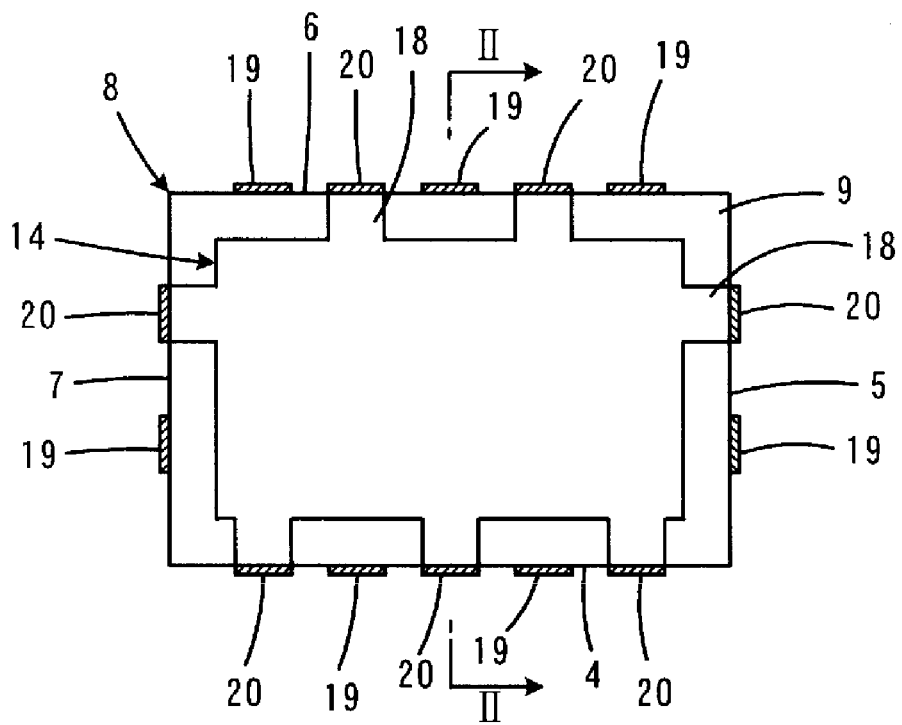

FIGS. 3A and 3B show plan views of internal structures of the first capacitor portion, in which FIG. 3A shows a cross-section of the first internal electrode 13 and FIG. 3B shows a cross-section of the second internal electrode 14.

As shown in FIG. 3A, the first internal electrode 13 includes a plurality of, e.g., seven, first lead-out portions 17 which extend to the outer surface of the capacitor body 8, i.e., to the side surfaces 4 to 7. In addition, as shown in FIG. 3B, the second internal electrode 14 includes a plurality of, e.g., seven, second lead-out portions 18 which extend to the outer surface of the capacitor body 8, i.e., the side surfaces 4 to 7.

On the side surfaces 4 to 7 of the capacitor body 8, a plurality of, e.g., seven, first external terminal electrodes 19 respectively electrically connected to the first lead-out portions 17, and a plurality of, e.g., seven, second external terminal electrodes 20 respectively electrically connected to the second lead-out portions 18 are provided. The first and second external terminal electrodes 19 and 20 are arranged so as to extend from the side surfaces 4 to 7 onto portions of individual principal surfaces 2 and 3, as shown in FIG. 1 and FIG. 2.

The locations on the side surfaces 4 to 7 to which the individual first lead-out portions 17 extend are different from the locations to which the individual second lead-out portions 18 extend. Thus, the locations of the individual first external terminal electrodes 19 disposed on the side surfaces 4 to 7 are different from the locations of the individual second external terminal electrodes 20. The first external terminal electrodes 19 and the second external terminal electrodes 20 are alternately arranged on the side surfaces 4 to 7.

Figure 4A:
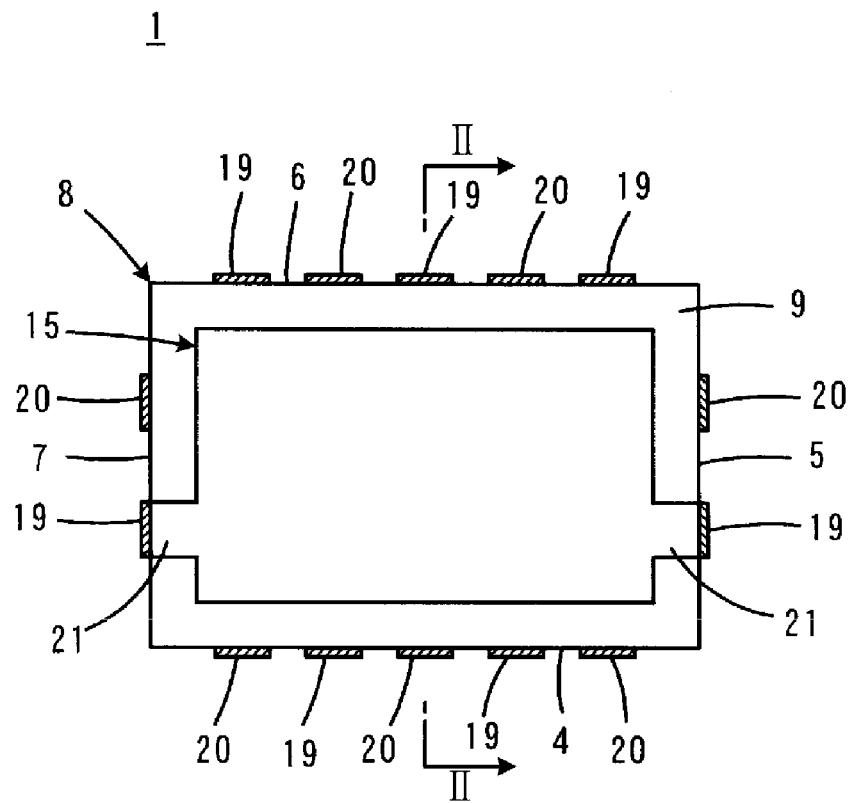
Figure 4B:
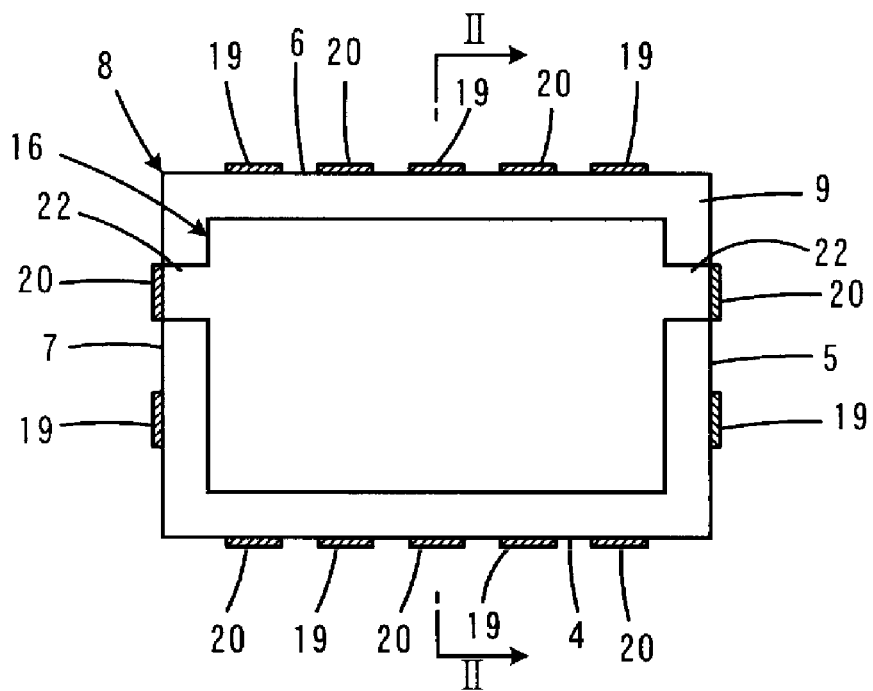

FIGS. 4A and 4B show plan views of internal structures of the second capacitor portion 12, in which FIG. 4A shows a cross-section of the third internal electrode 15 and FIG. 4B shows a cross-section of the fourth internal electrode 16.

As shown in FIG. 4A, the third internal electrode 15 includes at least one, e.g., two, third lead-out portions 21 which extend to the outer surface of the capacitor body 8, i.e., the side surfaces 5 and 7. In addition, as shown in FIG. 4B, the fourth internal electrode 16 includes at least one, e.g., two, fourth lead-out portions 22 which extend to the outer surface of the capacitor body 8, i.e., the side surfaces 5 and 7.

In this preferred embodiment, the third lead-out portions 21 are electrically connected to the first external terminal electrodes 19 described above, and the fourth lead-out portions 22 are electrically connected to the second external terminal electrodes 20 described above. That is, some of the first external terminal electrodes 19 and third external terminal electrodes to be electrically connected to the third lead-out portions 21 are integrally formed, and some of the second external terminal electrodes 20 and fourth external terminal electrodes to be electrically connected to the fourth lead-out portions 22 are integrally formed.

As described above, the third and fourth lead-out portions 21 and 22 are electrically connected to the first and second external terminal electrodes 19 and 20, respectively, which are shared with the first and second lead-out portions 17 and 18, respectively. This results in a state in which the first capacitor portions 11 and the second capacitor portion 12 are connected in parallel within the multilayer capacitor 1.

Note that the third and fourth external terminal electrodes to be connected to the third and fourth lead-out portions 21 and 22, respectively, may be provided separately from the first and second external terminal electrodes.

In the preferred embodiment described above, the number of third lead-out portions 21 and the number of fourth lead-out portions 22 for the third and fourth internal electrodes 15 and 16, respectively, are less than the number of first lead-out portions 17 and the number of second lead-out portions 18, respectively, for the first and second internal electrodes 13 and 14. Specifically, the number of third lead-out portions 21 is two and the number of fourth lead-out portions 22 is two, and the number of first lead-out portions 17 is seven and the number of second lead-out portions 18 is seven. Therefore, if the other conditions, such as the material of the internal electrodes 13 to 16, are the same, the ESL of the first capacitor portions 11 can be set to a lower value than the ESL of the second capacitor portion 12. As a result, the resonant frequency of the first capacitor portions 11 can be set to be greater than the resonant frequency of the second capacitor portion 12.

On the other hand, as described above, the number of the third lead-out portions 21 and the number of the fourth lead-out portions 22 are less than the number of the first lead-out portions 17 and the number of the second lead-out portions 18, respectively. Thus, if the effects of the internal electrodes 13 to 16 or the lead-out portions 17, 18, 21, and 22 on the ESR do not differ between the first capacitor portions 11 and the second capacitor portion 12, an ESR per layer produced by one pair of the third and fourth internal electrodes 15 and 16 and an intervening one of the dielectric layers 9 included in the second capacitor portion 12 can be set to be greater than an ESR per layer produced by one pair of the first and second internal electrodes 13 and 14 and an intervening one of the dielectric layers 9 included in the first capacitor portions 11.

On the basis of arrangement described above, in the characteristics of the multilayer capacitor 1, the low ESL characteristics due to the first capacitor portions 11 has an advantageous effect, and high ESR characteristics in which the ESR characteristics of the first capacitor portions 11 and the ESR characteristics of the second capacitor portion 12 are reflected, are provided. Thus, with the multilayer capacitor 1, both low ESL and high ESR can be achieved.

In addition, in the multilayer capacitor 1, as described above, the resonant frequency of the first capacitor portions 11 is greater than the resonant frequency of the second capacitor portion 12. Furthermore, a combined ESR provided by all of the first and second internal electrodes 13 and 14 and the intervening dielectric layers 9 included in the first capacitor portions 11 is substantially equal to a combined ESR provided by all of the third and fourth internal electrodes 15 and 16 and the intervening dielectric layers 9 included in the second capacitor portion 12.

Figure 5:
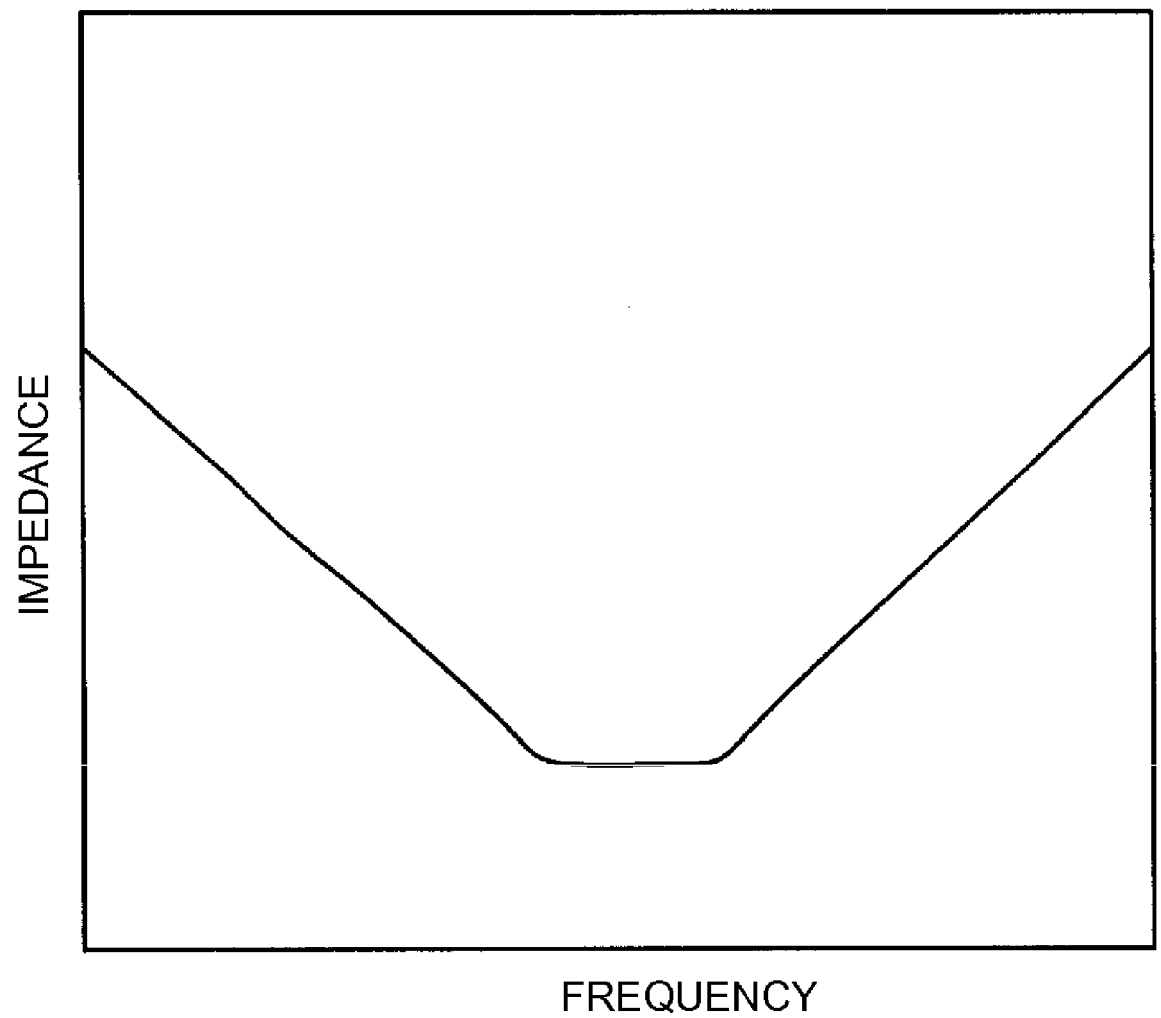
FIG. 5 shows a frequency-impedance characteristic diagram illustratively showing a resonant frequency band of a multilayer capacitor which is increased in accordance with a preferred embodiment of the present invention.

Therefore, in the characteristics of the entire multilayer capacitor 1, the characteristics of both the first and second capacitor portions 11 and 12 are combined, and wide-band frequency-impedance characteristics, in which substantially the same impedance value is continuously obtained from the resonance point of the second capacitor portion in the low frequency side to the resonance point of the first capacitor portion in the high frequency side, can be achieved. More specifically, as shown in FIG. 5, the multilayer capacitor 1 has wide-band frequency-impedance characteristics in which a frequency band in which low impedance can be obtained is increased. In FIG. 5, although no scale or numerical values are provided on the axes representing the frequency and impedance, it is to be understood that FIG. 5 indicates a typical tendency of frequency-impedance characteristics.

While the present invention has been described above in relation to the illustrated preferred embodiment, various other modifications are possible within the scope of the present invention.

For example, the locations or the number of lead-out portions, or the locations or the number of external terminal electrodes may be changed.

In addition, in the illustrated preferred embodiment, the first and second internal electrodes 13 and 14 are provided to define the first capacitor portions 11, and the third and fourth internal electrodes 15 and 16 are provided to define the second capacitor portion 12. However, an internal electrode located at the boundary of a first capacitor portion and a second capacitor portion may be provided as an internal electrode for both of the first and second capacitor portions, i.e., an internal electrode that functions as both of the first and second internal electrodes and the third and fourth internal electrodes.

In addition, to set the resonant frequency of the first capacitor portions 11 to be greater than the resonant frequency of the second capacitor portion 12, in the preferred embodiment described above, the number of (or the number of pairs of) the first and second lead-out portions 17 and 18 is set to be greater than the number of (or the number of pairs of) the third and fourth lead-out portions 21 and 22. However, instead of or in addition to such a method, a method in which the material, the pattern and/or the number of layers of the internal electrodes 13 to 16 are changed may be used.

In addition, in the preferred embodiment described above, to set the ESL per layer in the second capacitor portion 12 to be greater than the ESR per layer in the first capacitor portions 11, the number of the third and fourth lead-out portions 21 and 22 is set to be less than the number of the first and second lead-out portions 17 and 18. However, instead of or in addition to such a method, it is possible to use a method in which the material with a high resistivity is used for the third and/or fourth internal electrodes 15 and/or 16, in which the thicknesses of the third and/or fourth internal electrodes 15 and/or 16 are reduced, or in which the widths or the thicknesses of the third and/or fourth lead-out portions 21 and/or 22 are reduced.

In addition, the locations of first and second capacitor portions in a capacitor body may be modified, as described in the following examples.

FIGS. 6A to 6D show some examples of layer arrangements of first and second capacitor portions used in a capacitor body. In FIGS. 6A to 6D, elements corresponding to those shown in FIG. 2 are designated by the same reference characters, and the description thereof is omitted.

In FIGS. 6A to 6D, portions designated by a reference character "41" indicate outer layer portions in which no internal electrodes are provided. In addition, in FIGS. 6A to 6D, it is assumed that a mounting plane provided by a wiring substrate, for example, is located at the lower side of each of FIGS. 6A to 6D.

In every one of the examples shown in FIGS. 6A to 6D, a first capacitor portion 11 and a second capacitor portion 12 are arranged in the direction of lamination in a capacitor body 8.

Figure 6A:
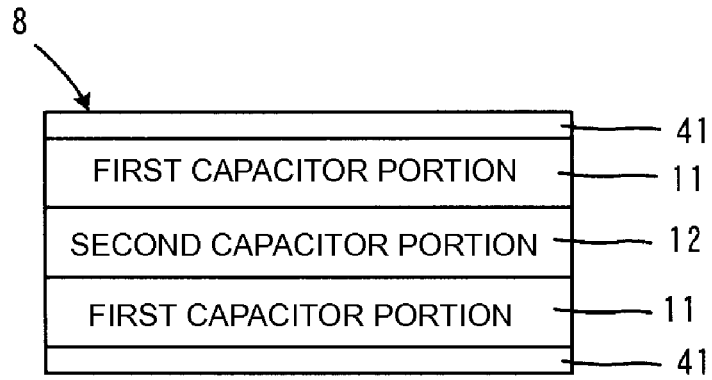
FIGS. 6A to 6D show some examples of layer arrangements for the first capacitor portion and the second capacitor portion in a capacitor body of the multilayer capacitor according to preferred embodiments of the present invention.

In the example shown in FIG. 6A, two first capacitor portions 11 are disposed so as to sandwich one second capacitor portion 12 in the direction of lamination. Note that this layer arrangement is similar to the arrangement in the preferred embodiment shown in FIG. 2.

Figure 6B:
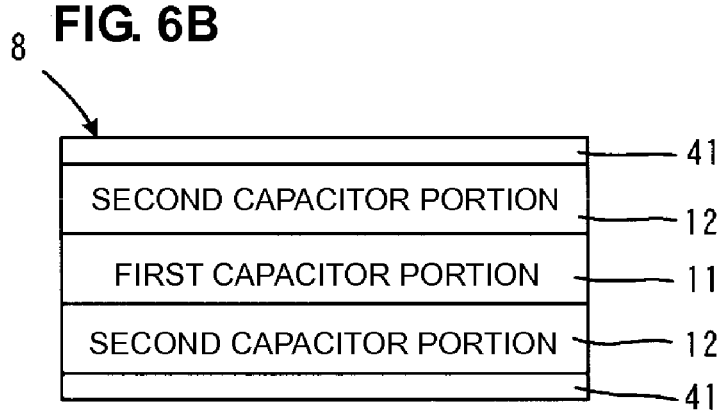

In the example shown in FIG. 6B, two second capacitor portions 12 are disposed so as to sandwich one first capacitor portion 11.

Figure 6C:
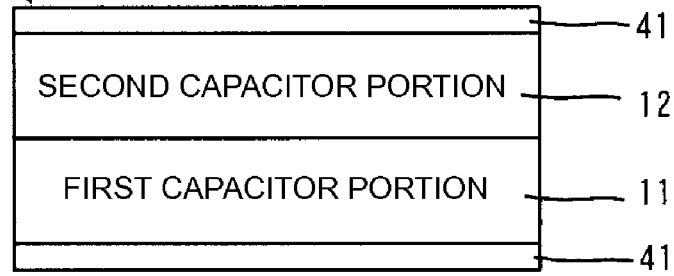

In the example shown in FIG. 6C, a first capacitor portion 11 is provided at the mounting plane side, and a second capacitor portion 12 is disposed on the capacitor portion 11.

Figure 6D:
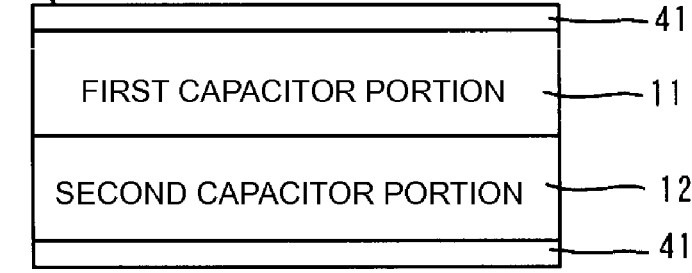
Figure 7:
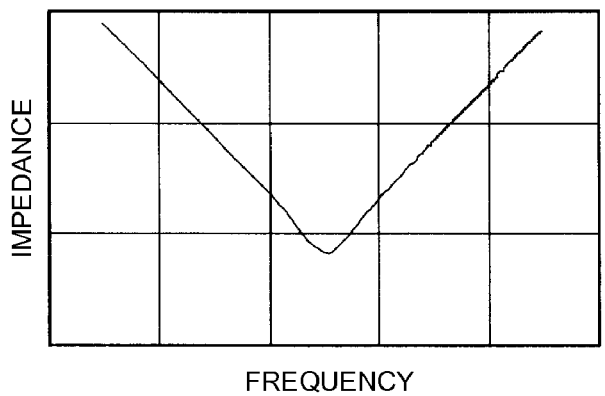
FIG. 7 is a diagram showing frequency-impedance characteristics of Sample 1 made in an example of an experiment conducted in order to verify the effects and advantages of preferred embodiments of the present invention.
Figure 8:
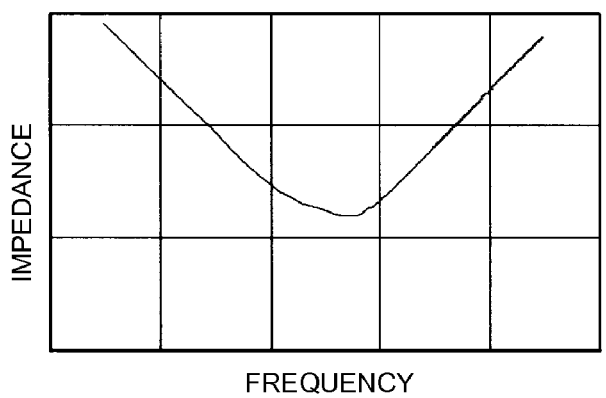
FIG. 8 is a diagram showing frequency-impedance characteristics of Sample 2 made in the experiment example.
Figure 9:
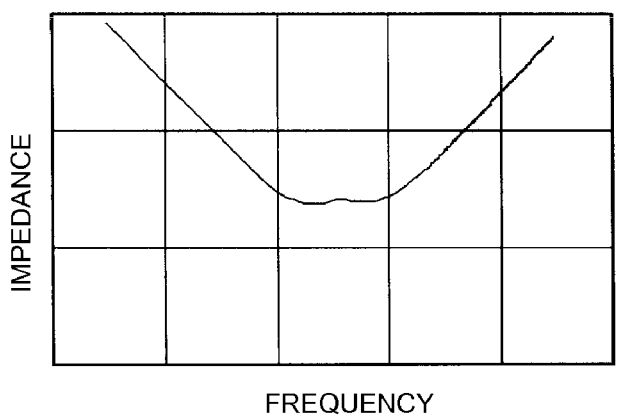
FIG. 9 is a diagram showing frequency-impedance characteristics of Sample 3 made in the experiment example.
Figure 10:
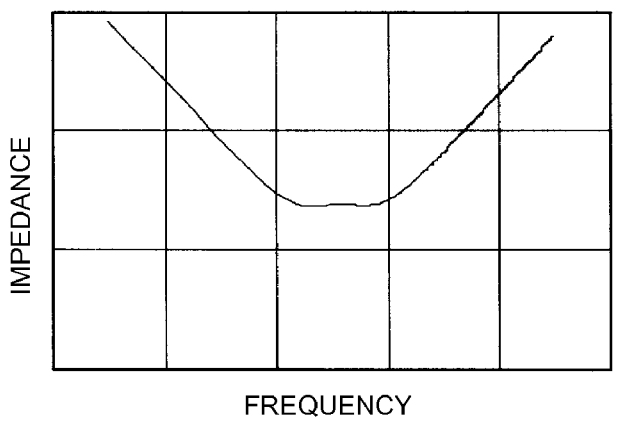
FIG. 10 is a diagram showing frequency-impedance characteristics of Sample 4 made in the experiment example.
Figure 11:
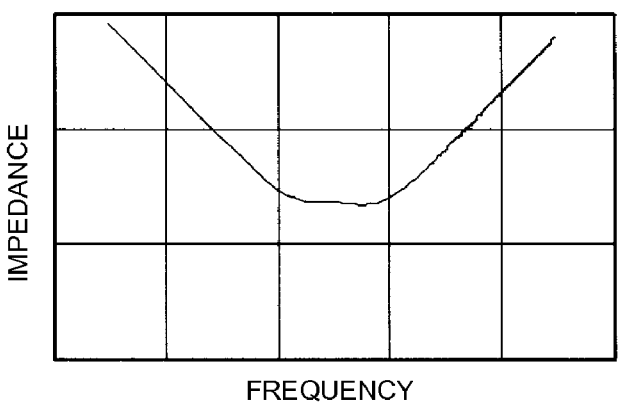
FIG. 11 is a diagram showing frequency-impedance characteristics of Sample 5 made in the experiment example.
Figure 12:
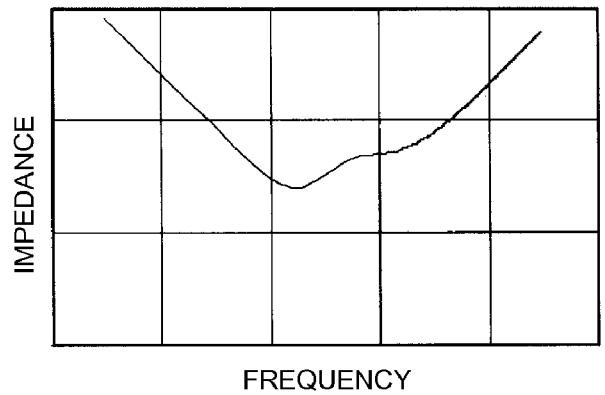
FIG. 12 is a diagram showing frequency-impedance characteristics of Sample 6 made in the experiment example.
Figure 13:
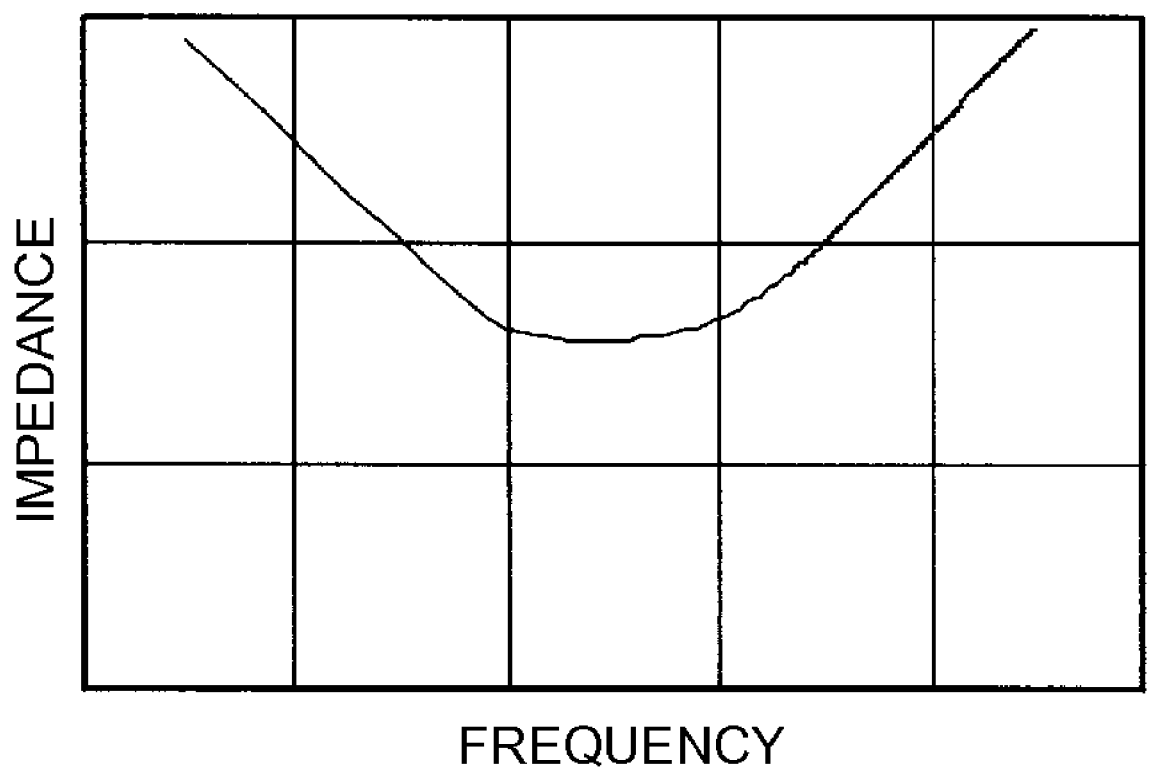
FIG. 13 is a diagram showing frequency-impedance characteristics of Sample 7 made in the experiment example.

In the example shown in FIG. 6D, a second capacitor portion 12 is provided at the mounting plane side, and a first capacitor portion 11 is disposed on the second capacitor portion 12.

In the following, an experiment conducted to verify the effects and advantages of the present invention will be described.

In this experimental example, a multilayer capacitor according to each sample shown in Table 1 was made through processes of preparing a plurality of ceramic green sheets, forming internal electrodes having lead-out portions on specific ceramic green sheets by printing of conductive paste, laminating a plurality of ceramic green sheets including the ceramic green sheets having the internal electrodes formed thereon, obtaining a capacitor body by burning the resultant laminate, and forming external terminal electrodes on the outer surfaces of the capacitor body by baking conductive paste.

In each of the multilayer capacitors of the individual samples, the dimensions of the capacitor body preferably were about 2.0 mm×about 1.25 mm×about 0.5 mm, the total number of laminated layers of internal electrodes was 64, and the design value of capacitance was 0.68 µF, for example. Similar to the preferred embodiment shown in FIG. 1 and other figures, the number of external terminal electrodes was 14, the number of each of first and second lead-out portions for respective first and second internal electrodes in the first capacitor portion was 7, and the number of each of respective third and fourth lead-out portions for respective third and fourth internal electrodes in the second capacitor portion was 2. In addition, the thickness of each of the internal electrodes was about 1 µm, the thickness of each of the lead-out portions was about 1 µm, and the width of each of the lead-out portions was about 100 µm, for example.

In addition, "Difference in combined ESRs" indicates the absolute value of a difference between "Entire combined ESR" of the first capacitor portion and "Entire combined ESR" of the second capacitor portion.

Note that in Table 1, Samples 1 and 7 are examples for comparison. Sample 1 includes only a first capacitor portion in which the number of lead-out portions is 7 and corresponds to the structure disclosed in Japanese Unexamined Patent Application Publication No. H11-144996 described above. Sample 7 includes only a second capacitor portion in which the number of lead-out portions is 2 and corresponds to the structure disclosed in Japanese Unexamined Patent Application Publication No. 2001-284170 described above.

Each of Samples 2 to 6 satisfies a condition in which "Resonant frequency" of "First capacitor portion" is greater than "Resonant frequency" of "Second capacitor portion" and a condition in which "ESR per layer" of "Second capacitor portion" is greater than "ESR per layer" of "First capacitor portion".

Referring to "Difference in combined ESRs" for Samples 2 to 6, the values for Samples 2 and 6 are relatively large while the values for Samples 3 to 5 are relatively small. That is, for each of Samples 3 to 5, "Entire combined ESR" of "First capacitor portion" is substantially equal to "Entire combined ESR" of "Second capacitor portion".

Under such conditions, frequency-impedance characteristics were calculated for each of Samples 1 to 7, and results

TABLE 1

| Sample No. | First capacitor portion | | | | Second capacitor portion | | | | Difference in combined ESRs [mΩ] |
|---|---|---|---|---|---|---|---|---|---|
| | Number of laminated layers | Resonant frequency [MHz] | ESR per layer [mΩ] | Entire combined ESR [mΩ] | Number of laminated layers | Resonant frequency [MHz] | ESR per layer [mΩ] | Entire combined ESR [mΩ] | |
| 1 | 64 | 32.8 | 163 | 6.8 | | | | | |
| 2 | 22 | 51.9 | 167 | 19.5 | 42 | 20.2 | 614 | 36.2 | 16.7 |
| 3 | 13 | 68.7 | 169 | 32.5 | 51 | 18.3 | 602 | 29.9 | 2.6 |
| 4 | 14 | 66 | 161 | 30.3 | 50 | 18.5 | 590 | 30.5 | 0.2 |
| 5 | 15 | 63.6 | 167 | 28.4 | 49 | 18.7 | 601 | 31.1 | 2.7 |
| 6 | 6 | 106.4 | 167 | 67.2 | 58 | 17.1 | 604 | 26.3 | 40.9 |
| 7 | | | | | 64 | 16.1 | 890 | 36.7 | |

In Table 1, each of the fields "First capacitor portion" and "Second capacitor portion", "Number of laminated layers", "Resonant frequency", "ESR per layer", and "Entire combined ESR" are presented.

In Table 1, "Entire combined ESR" refers to, for the first capacitor portion, a combined ESR provided by all of the first and second internal electrodes and intervening dielectric layers included in the first capacitor portion, and refers to, for the second capacitor portion, a combined ESR provided by all of the third and fourth internal electrodes and intervening dielectric layers included in the second capacitor portion.

"ESR per layer" is calculated as follows. An ESR of a capacitor can be represented by the following equation, where R denotes the resistance per one electrode layer and N denotes the number of laminated layers.

$$\text{ESR of capacitor} = R(4N-2)/N^2$$

For example, in the first capacitor portion, the resistance R per electrode layer is calculated by inverse calculation using the ESR of the entire first capacitor portion as the ESR of the capacitor, and "ESR per layer" is calculated by substituting the value of R and N=2 (one layer of capacitor is composed of two opposing internal electrodes) into the above equation.

shown in FIG. 7 to FIG. 13 were obtained. Note that in the graphs shown in FIG. 7 to FIG. 13, the frequency along the abscissa and the impedance along the ordinate are both indicated using a logarithmic scale.

As seen from a comparison of FIG. 7 to FIG. 13, in each of Sample 1 (FIG. 7) and Sample 7 (FIG. 13), which are comparative examples, and each of Sample 2 (FIG. 8) and Sample 6 (FIG. 12), in which "Difference in combined ESRs" is relatively large, a frequency band with low impedance was not very wide. However, in each of Samples 3 to 5 (FIG. 9 to FIG. 11), in which "Difference in combined ESRs" is very small, a relatively wide frequency band with low impedance was obtained.

While preferred embodiments of the invention have been described above, it is to be understood that variations and modifications will be apparent to those skilled in the art without departing the scope and spirit of the invention. The scope of the invention, therefore, is to be determined solely by the following claims.

What is claimed is:

1. A multilayer capacitor comprising:
   a capacitor body having a layered structure including a plurality of laminated dielectric layers; wherein the capacitor body includes first and second capacitor portions;

the first capacitor portion includes at least one pair of first and second internal electrodes opposing each other with a predetermined one of the dielectric layers interposed therebetween to define a capacitance;

the second capacitor portion includes at least one pair of third and fourth internal electrodes opposing each other with a predetermined one of the dielectric layers interposed therebetween to define a capacitance;

a resonant frequency of the first capacitor portion is greater than a resonant frequency of the second capacitor portion;

an equivalent series resistance per layer provided by one pair of the third and fourth internal electrodes and an intervening one of the dielectric layers included in the second capacitor portion is greater than an equivalent series resistance per layer provided by one pair of the first and second internal electrodes and an intervening one of the dielectric layers included in the first capacitor portion; and a combined equivalent series resistance provided by all of the first and second internal electrodes and the intervening dielectric layers included in the first capacitor portion is substantially equal to a combined equivalent series resistance provided by all of the third and fourth internal electrodes and the intervening dielectric layers included in the second capacitor portion.

2. The multilayer capacitor according to claim 1, wherein the capacitor body includes two first capacitor portions and one second capacitor portion disposed between the two first capacitor portions.

3. The multilayer capacitor according to claim 1, wherein the capacitor body includes two second capacitor portions and one first capacitor portion disposed between the two second capacitor portions.

4. The multilayer capacitor according to claim 1, wherein the capacitor body includes one first capacitor portion and one second capacitor portion.

5. The multilayer capacitor according to claim 1, wherein each of the first and second internal electrodes includes seven lead-out portions that extend to an outer surface of the capacitor body.

6. The multilayer capacitor according to claim 1, wherein each of the third and fourth internal electrodes includes two lead-out portions that extend to an outer surface of the capacitor body.

\* \* \* \* \*

UNITED STATES PATENT AND TRADEMARK OFFICE
CERTIFICATE OF CORRECTION

PATENT NO.         : 7,466,535 B2
APPLICATION NO. : 12/120789
DATED                  : December 16, 2008
INVENTOR(S)        : Hirokazu Takashima et al.

Page 1 of 1

It is certified that error appears in the above-identified patent and that said Letters Patent is hereby corrected as shown below:

Title Page, Item (56)
On the second page of the Letters Patent, in the Foreign Patent Documents, the reference "JP 2002-164450 A 6/2000" should be corrected to
-- JP 2000-164450 6/2000 --.

Signed and Sealed this

Sixteenth Day of June, 2009

JOHN DOLL
*Acting Director of the United States Patent and Trademark Office*